(12) United States Patent
Vaduvatha et al.

(10) Patent No.: US 10,157,123 B1
(45) Date of Patent: *Dec. 18, 2018

(54) METHODS AND APPARATUS FOR A SCHEDULER FOR MEMORY ACCESS

(71) Applicant: Juniper Networks, Inc., Sunnyvale, CA (US)

(72) Inventors: Srinivas Vaduvatha, Fremont, CA (US); Deepak Goel, San Jose, CA (US); Shahriar Ilislamloo, Saratoga, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/799,013

(22) Filed: Oct. 31, 2017

Related U.S. Application Data

(63) Continuation of application No. 13/955,733, filed on Jul. 31, 2013, now Pat. No. 9,811,453.

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |

(52) U.S. Cl.
CPC ............ *G06F 12/00* (2013.01); *G06F 3/0659* (2013.01); *G06F 2212/1016* (2013.01); *G06F 2212/1024* (2013.01)

(58) Field of Classification Search
CPC ............ G06F 3/00; G06F 3/06–3/0689; G06F 12/00–12/16; G06F 2212/00–2212/7211
See application file for complete search history.

(56) References Cited

U.S. PATENT DOCUMENTS 5,745,913 A * 4/1998 Pattin et al. ................. 711/105
5,835,968 A * 11/1998 Mahalingaiah ..... G06F 12/0875
　　　　　　　　　　　　　　　　　　　　　　711/214

(Continued)

OTHER PUBLICATIONS

I/O scheduling with mapping cache awareness for flash based storage systems; Ji et al.; 2016 International Conference on Embedded Software; Oct. 2-7, 2016 (Year: 2016).*

(Continued)

*Primary Examiner* — Daniel C Chappell
(74) *Attorney, Agent, or Firm* — Cooley LLP

(57) ABSTRACT

An apparatus includes a scheduler module operatively coupled to each memory block from a set of memory blocks via a shared address bus. The scheduler module is configured to receive a group of memory commands from a set of memory controllers. Each memory controller from the set of memory controllers is uniquely associated with a different memory block from the set of memory blocks. The scheduler module is configured to classify each memory command from the group of memory commands into a category based at least in part on memory commands previously sent to the set of memory blocks via the shared address bus. The scheduler module is configured to select an order in which to send each memory command from the group of memory commands to the set of memory blocks via the shared address bus based at least in part on the category of each memory command.

20 Claims, 3 Drawing Sheets

(56) References Cited

U.S. PATENT DOCUMENTS

| | | | | |
|---|---|---|---|---|
| 6,112,265 | A * | 8/2000 | Harriman | G06F 3/061 710/39 |
| 6,204,864 | B1 * | 3/2001 | Chee | 345/531 |
| 6,297,832 | B1 * | 10/2001 | Mizuyabu et al. | 345/540 |
| 6,317,813 | B1 * | 11/2001 | Su et al. | 711/158 |
| 7,917,706 | B1 * | 3/2011 | May | G06F 13/1642 710/113 |
| 8,341,374 | B2 * | 12/2012 | Kwon | G06F 3/0611 711/103 |
| 8,601,169 | B1 * | 12/2013 | Paragaonkar | G06F 3/0613 710/52 |
| 8,725,931 | B1 * | 5/2014 | Kang | G06F 12/0246 710/52 |
| 8,756,369 | B2 * | 6/2014 | McKean | G06F 3/0611 710/241 |
| 8,788,779 | B1 * | 7/2014 | Horn | G06F 3/0616 711/167 |
| 8,835,968 | B2 * | 9/2014 | Ha | H01L 33/58 257/98 |
| 8,886,872 | B1 * | 11/2014 | Norrie | G06F 17/30327 710/38 |
| 8,972,689 | B1 * | 3/2015 | de la Iglesia | G06F 3/0628 710/20 |
| 9,639,280 | B2 * | 5/2017 | Roberts | G06F 3/0611 |
| 2001/0010066 | A1 * | 7/2001 | Chin et al. | 711/108 |
| 2002/0071321 | A1 * | 6/2002 | Barri et al. | 365/200 |
| 2002/0103923 | A1 * | 8/2002 | Cherian | G06F 3/0613 709/235 |
| 2003/0065897 | A1 * | 4/2003 | Sadowsky et al. | 711/165 |
| 2005/0138300 | A1 * | 6/2005 | Chen | 711/151 |
| 2007/0091696 | A1 * | 4/2007 | Niggemeier | G06F 13/18 365/198 |
| 2007/0156946 | A1 * | 7/2007 | Lakshmanamurthy et al. | 711/5 |
| 2007/0204270 | A1 * | 8/2007 | Shin | G06F 3/0611 718/103 |
| 2008/0109613 | A1 * | 5/2008 | Jarosh et al. | 711/154 |
| 2009/0016137 | A1 * | 1/2009 | Hur | G06F 13/1626 365/226 |
| 2009/0019243 | A1 * | 1/2009 | Hur | G06F 1/3225 711/158 |
| 2009/0138670 | A1 * | 5/2009 | Mutlu et al. | 711/167 |
| 2009/0198963 | A1 * | 8/2009 | Arimilli | G06F 9/30032 712/205 |
| 2009/0319730 | A1 * | 12/2009 | Tanaka | G06F 13/4243 711/154 |
| 2011/0023038 | A1 * | 1/2011 | Memik | G06F 9/3824 718/101 |
| 2011/0179200 | A1 * | 7/2011 | Sukonik | G06F 13/1626 710/53 |
| 2011/0179240 | A1 * | 7/2011 | Sukonik | G06F 13/18 711/158 |
| 2011/0302586 | A1 * | 12/2011 | Chung | G06F 9/5016 718/103 |
| 2012/0144104 | A1 * | 6/2012 | Gibney | G06F 13/1626 711/105 |
| 2012/0173786 | A1 * | 7/2012 | Simon | G06F 13/30 710/308 |
| 2013/0138912 | A1 * | 5/2013 | Bux | G06F 12/0646 711/170 |
| 2013/0151867 | A1 * | 6/2013 | Dodson | G06F 13/16 713/300 |
| 2014/0201471 | A1 * | 7/2014 | Cutter | G06F 13/1663 711/151 |
| 2015/0006841 | A1 * | 1/2015 | Chen | G06F 13/4239 711/167 |

OTHER PUBLICATIONS

Physically addressed queueing (PAQ): Improving parallelism in solid state disks; Jung et al.; 2012 39th Annual International Symposium on Computer Architecture; Jun. 9-13, 2012 (Year: 2012).*

HIOS: A host interface I/O scheduler for Solid State Disks; Jung et al.; 2014 ACM/IEEE 41st International Symposium on Computer Architecture; Jun. 14-18, 2014 (Year: 2014).*

Hardware-Software Co-design to Mitigate DRAM Refresh Overheads: A Case for Refresh-Aware Process Scheduling; Kotra et al.; Proceedings of the Twenty-Second International Conference on Architectural Support for Programming Languages and Operating Systems; Apr. 8-12, 2017; pp. 723-736 (Year: 2017).*

Improving the SSD Performance by Exploiting Request Characteristics and Internal Parallelism; Mao et al.; IEEE Transactions on Computer-Aided Design of Integrated Circuits and Systems, vol. 37, iss. 2; Feb. 2018; pp. 472-484 (Year: 2018).*

An efficient parallel executing command scheduler for NAND flash storage systems; Yan et al.; IEEE 4th International Conference on Electronics Information and Emergency Communication; Nov. 15-17, 2013 (Year: 2013).*

* cited by examiner

Memory Block 200

|   | A | B | C | D | E | F | G | H | I | J | K | L | M | N | O | P | Q |
|---|---|---|---|---|---|---|---|---|---|---|---|---|---|---|---|---|---|
| 1 | | | | | | | | | | | | | | | | | |
| 2 | | | | | | | | | | | | | | | | | |
| 3 | | | | | | | | | | | | | | | | | |
| 4 | | | | | | | | | | | | | | | | | |
| 5 | | | | | | | | | | | | | | | | | |
| 6 | | | | | | | | | | | | | | | | | |
| 7 | | | | | | | | | | | | | | | | | |
| 8 | | | | | | | | | | | | | | | | | |
| 9 | | | | | | | | | | | | | | | | | |
| 10 | | | | | | | | | | | | | | | | | |
| 11 | | | | | | | | | | | | | | | | | |
| 12 | | | | | | | | | | | | | | | | | |
| 13 | | | | | | | | | | | | | | | | | |

Receive, at a scheduler module, a set of memory commands from a set of memory controllers, the scheduler module operatively coupled to each memory block from a set of memory blocks via a shared address bus, each memory controller from the set of memory controllers being uniquely associated with a memory block from the set of memory blocks.
310

---

Select a first memory command from the set of memory commands to send to the set of memory blocks via the shared address bus at a first clock cycle based at least in part on a type of the first memory command.
330

---

Send the first memory command to the set of memory blocks at the first clock cycle such that the first memory command is executed at a memory block associated with the first memory command and from the set of memory blocks.
350

---

Select a second memory command from the set of memory commands to send to the set of memory blocks via the shared address bus at a second clock cycle based at least in part on the type of the first memory command, a number of clock cycles between the first clock cycle and the second clock cycle, a memory block associated with the second memory command and from the set of memory blocks, and a type of the second memory command.
370

---

Send the second memory command to the set of memory blocks at the second clock cycle such that the second memory command is executed at the memory block associated with the second memory command.
390

Fig. 3

METHODS AND APPARATUS FOR A SCHEDULER FOR MEMORY ACCESS

CROSS-REFERENCE TO RELATED APPLICATION

This application claims priority to and is a continuation of U.S. application Ser. No. 13/955,733, now U.S. Pat. No. 9,811,453, entitled "METHODS AND APPARATUS FOR A SCHEDULER FOR MEMORY ACCESS" and filed Jul. 31, 2013, the content of which is expressly incorporated herein by reference in its entirety.

BACKGROUND

Some embodiments described herein relate generally to mechanisms for accessing multiple memories, and, in particular, to methods and apparatus for efficiently scheduling requests to access multiple memories that share a common address bus or control interface.

Some memory systems use a single address bus or control interface to control each independent memory part. Such a mechanism is, however, typically not scalable to a large number of memory parts. Some other memory systems use a shared address bus or control interface across multiple independent memory parts. In such memory systems, the shared address bus or control interface is typically the bottleneck for processing workloads, and the performance of the memory systems is typically limited by the number of commands that can be issued on the shared address bus or control interface. Some of such memory systems access two independent memory parts in a strict time-division multiplexing (TDM) manner. Such a strict TDM scheduling scheme, however, typically results in substantially low performance when applied to memory systems with three or more independent memory parts.

Accordingly, a need exists for methods and apparatus that can efficiently schedule requests to access multiple (e.g., more than two) memory parts that share an address bus or control interface.

SUMMARY

An apparatus includes a scheduler module operatively coupled to each memory block from a set of memory blocks via a shared address bus. The scheduler module is configured to receive a group of memory commands from a set of memory controllers. Each memory controller from the set of memory controllers is uniquely associated with a different memory block from the set of memory blocks. The scheduler module is configured to classify each memory command from the group of memory commands into a category based at least in part on memory commands previously sent to the set of memory blocks via the shared address bus. The scheduler module is configured to select an order in which to send each memory command from the group of memory commands to the set of memory blocks via the shared address bus based at least in part on the category of each memory command.

BRIEF DESCRIPTION OF THE DRAWINGS

FIG. 2 is a schematic illustration of structure of a memory block, according to an embodiment.

FIG. 3 is a flow chart illustrating a method for scheduling memory commands at a scheduler module, according to an embodiment.

DETAILED DESCRIPTION

Figure 1:
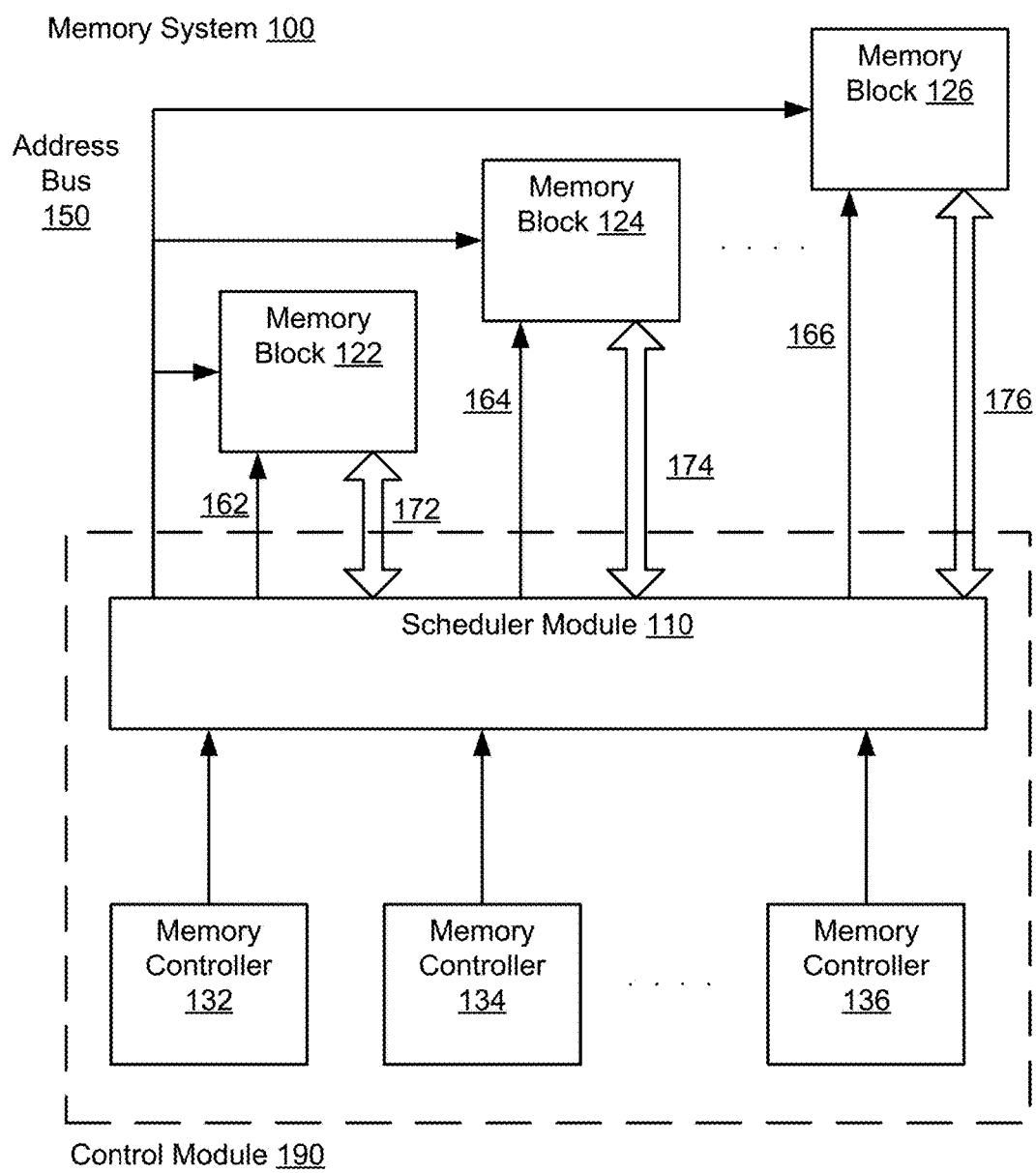
FIG. 1 is a schematic illustration of a memory system, according to an embodiment.

In some embodiments, an apparatus includes a scheduler module implemented in at least one of a memory or a processing device. The scheduler module is configured to be operatively coupled to each memory block from a set of memory blocks via a shared address bus. Each memory block from the set of memory blocks can be, for example, a Double Data Rate (DDR) Random Access Memory (RAM) block and/or the like. In some instances, the set of memory blocks can include at least three memory blocks. In some instances, the scheduler module can be included within, for example, one of an Application Specific Integrated Circuit (ASIC), a Field-Programmable Gate Array (FPGA), or a general processor. The scheduler module can be operatively coupled to each memory block from the set of memory blocks via a unique data connection from a set of data connections.

The scheduler module is configured to receive a group of memory commands from a set of memory controllers. Each memory controller from the set of memory controllers is uniquely associated with a different memory block from the set of memory blocks. The group of memory commands can include, for example, at least one of a Row Address Strobe (RAS) command, a Column Address Strobe (CAS) command, a precharge command, a refresh command, a write command directly following a read command, or a read command directly following a write command.

The scheduler module is configured to classify each memory command from the group of memory commands into a category from a group of categories based at least in part on a set of memory commands previously sent to the set of memory blocks via the shared address bus. In some instances, each category from the group of categories can be associated with a different priority level from a set of priority levels. In some instances, the scheduler module can be configured to classify a memory command from the group of memory commands and uniquely associated with a memory block from the set of memory blocks into a category from the group of categories. Such a classifying can be based, for example, at least in part on a latency of a memory command that is uniquely associated with that memory block and previously sent to the set of memory blocks via the shared address bus.

The scheduler module is configured to select an order in which to send each memory command from the group of memory commands to the set of memory blocks via the shared address bus. Such a selecting can be based, for example, at least in part on the category of each memory command from the group of memory commands. In some instances, the scheduler module can be configured to ensure a predefined number of clock cycles between, for example, a first RAS command from the group of memory commands and sent to a memory block from the set of memory blocks via the shared address bus, and a second RAS command from the group of memory commands and sent to the memory block via the shared address bus. In some instances, the scheduler module can be configured to substantially optimize a ratio of, for example, a number of CAS commands provided to the set of memory blocks via the shared address bus to a total number of clock cycles.

In some embodiments, a method includes receiving, at a scheduler module, a group of memory commands from a set of memory controllers. The scheduler module is operatively coupled to each memory block from a set of memory blocks via a shared address bus. Each memory controller from the set of memory controllers is uniquely associated with a memory block from the set of memory blocks.

The method includes selecting a first memory command from the group of memory commands based at least in part on a type of the first memory command. The first memory command is to be sent to the set of memory blocks via the shared address bus at a first clock cycle. The method includes sending the first memory command to the set of memory blocks at the first clock cycle such that the first memory command is executed at a memory block associated with the first memory command and from the set of memory blocks.

The method also includes selecting a second memory command from the group of memory commands based at least in part on the type of the first memory command, a number of clock cycles between the first clock cycle and a second clock cycle after the first clock cycle, a memory block associated with the second memory command and from the set of memory blocks, and a type of the second memory command. The second memory command is to be sent to the set of memory blocks via the shared address bus at the second clock cycle. The method further includes sending the second memory command to the set of memory blocks at the second clock cycle such that the second memory command is executed at the memory block associated with the second memory command.

In some embodiments, an apparatus includes a scheduler module implemented in at least one of a memory or a processing device. The scheduler module is configured to be operatively coupled to each memory block from a set of memory blocks via a shared address bus. The scheduler module is configured to receive a group of memory commands from a set of memory controllers. Each memory controller from the set of memory controller is uniquely associated with a memory block from the set of memory blocks.

The scheduler module is configured to select a first memory command from the group of memory commands to send to the set of memory blocks via the shared address bus at a first clock cycle based at least in part on a type of the first memory command. The scheduler module is configured to send the first memory command to the set of memory blocks at the first clock cycle such that the first memory command is executed at a memory block associated with the first memory command and from the set of memory blocks.

The scheduler module is configured to select a second memory command from the group of memory commands to send to the set of memory blocks via the shared address bus at a second clock cycle after the first clock cycle based at least in part on the type of the first memory command and a type of the second memory command. The scheduler module is configured to receive the second memory command prior to receiving the first memory command. The scheduler module is configured to send the second memory command to the set of memory blocks at the second clock cycle such that the second memory command is executed at a memory block associated with the second memory command and from the set of memory blocks.

As used herein, a module can be, for example, any assembly and/or set of operatively-coupled electrical components associated with performing a specific function, and can include, for example, a memory, a processor, electrical traces, optical connectors, software (stored and/or executing in hardware), and/or the like.

As used herein, the singular forms "a," "an" and "the" include plural referents unless the context clearly dictates otherwise. Thus, for example, the term "a scheduler module" is intended to mean a single module or a combination of modules configured to perform functions associated with scheduling sending of memory commands for the multiple memory blocks.

FIG. 1 is a schematic illustration of a memory system 100, according to an embodiment. As shown in FIG. 1, the memory system 100 includes a scheduler module 110 operatively coupled to a set of memory controllers (e.g., memory controllers 132, 134, 136) and a set of memory blocks (e.g., memory blocks 122, 124, 126). In some embodiments, the memory system 100 can include more or less memory controllers and memory blocks than those shown in FIG. 1.

The memory system 100 can be implemented at one or more physical devices. For example, the scheduler module 110 and the set of memory controllers can be implemented at a data processing device (e.g., a printed circuit board), and the set of memory blocks can be hosted at a separate memory device (e.g., a removable memory module). When the memory device is connected to the data processing device (e.g., the removable memory module is inserted or mounted to a socket of the printed circuit board), the set of memory blocks is operatively coupled to the scheduler module 110 and the set of memory controllers. Thus, the memory system 100 is formed and data can be read from and/or written into the set of memory blocks.

Each memory controller (e.g., the memory controller 132, 134 or 136) from the set of memory controllers can be any device or module configured to define and/or issue memory commands associated with reading data from and/or writing data into the set of memory blocks. Such a memory controller can be or implemented within, for example, a field-programmable gate array (FPGA), an application specific integrated circuit (ASIC), a digital signal processor (DSP), and/or the like. In some embodiments, the set of memory controllers and the scheduler module 110 can be implemented as a single control module 190 at a physical device (e.g., a ASIC on a circuit board). In other embodiments, the set of memory controllers and the scheduler module 110 can be implemented as separate control modules or entities (e.g., separate FPGAs or ASICs) at the same or different devices. As shown in FIG. 1, each memory controller from the set of memory controllers is operatively coupled to the scheduler module 110.

The scheduler module 110 can be any device or module configured to receive, schedule and send memory commands associated with reading data from and/or writing data into the set of memory blocks. In some embodiments, the scheduler module 110 can be implemented in a processing device (e.g., a processor) or a memory. The scheduler module 200 can be, for example, a hardware-based module (e.g., a CPU, a general purpose processor, a DSP, a FPGA, a ASIC), a software-based module (e.g., a module of computer code stored in hardware and executed at a processor), and/or a combination of hardware and software-based modules. In some embodiments, the scheduler module 110 can be implemented in more than one processor and/or memory.

Each memory block (e.g., the memory block 122, 124 or 126) from the set of memory blocks can be any type of memory device configured to store data. Furthermore, each memory block from the set of memory blocks can be independently accessed for reading data from that memory block and/or writing data into that memory block. That is, each memory block from the set of memory blocks can be independently accessed without any impact on or interaction with other memory blocks from the set of memory blocks. Such a memory device can be, for example, a RAM (random-access memory) (e.g., a dynamic RAM, a static RAM), a DDR (double data rate) RAM, a flash memory, a removable memory module, and/or so forth. For example, the set of memory blocks can be off-the-shelf external DDR3 SDRAM (synchronous dynamic random-access memory) memories or any type of DRAM (dynamic random-access memory) memories that are widely used in various industries (e.g., computing, automotive, mobile, etc.). While the scheduling mechanism performed at the scheduler module 110 is shown and described herein as being applied on DDR3 SDRAM-based memory systems as an example, in other embodiments, the same or similar scheduling mechanism can be applied to any other DRAM system where data is transferred in a burst operation mode.

In some embodiments, the memory blocks from the set of memory blocks can be equal size (or substantially equal size) quasi-independent sections for storing data. For example, each memory block from the set of memory blocks can be a memory bank within a memory chip. Such a memory bank can have, for example, 16,000 rows of memory units. Each row of memory units can have, for example, 1024 columns of memory units. Memory units at each column of each row can store, for example, 4-16 bits of data. Furthermore, multiple memory blocks (e.g., memory banks) from the set of memory blocks can be included in a single memory chip. Multiple memory chips (each of which includes multiple memory blocks) can be combined on a single memory module (e.g., a removable memory module) that is operatively coupled to the scheduler module 110.

As shown in FIG. 1, each memory block from the set of memory blocks is operatively coupled to the scheduler module 110 via a shared address bus 150. As described in detail below, the scheduler module 110 can be configured to send memory commands to the set of memory blocks 122, 124, 126 using the shared address bus 150. In some embodiments, although not shown in FIG. 1 and described herein, the memory system 100 can implement any other type of control interface that can be shared by each memory block 122, 124, 126 from the set of memory blocks such that memory commands can be sent from the scheduler module 110 to the set of memory blocks via the common control interface.

In some embodiments, in addition to the shared address bus 150, each memory block 122, 124, 126 from the set of memory blocks can be coupled to the schedule module 110 via other separate or shared connections for transmitting control and/or data signals. For example, the memory block 122, 124 or 126 from the set of memory blocks can receive a chip-select (CS) control signal or an on-die termination (ODT) control signal (e.g., signal 162 for the memory block 122, signal 164 for the memory block 124, signal 166 for the memory block 126 as shown in FIG. 1) via a control path from the scheduler module 110.

In some embodiments, each memory block from the set of memory blocks can be connected to the scheduler module 110 via a unique data connection. As shown in FIG. 1, the memory block 122 is connected to the scheduler module 110 via a data path 172; the memory block 124 is connected to the scheduler module 110 via a data path 174; the memory block 126 is connected to the scheduler module 110 via a data path 176. As a result, a memory block from the set of memory block can receive data from and/or transmit data to the scheduler module 110 or another module (not shown in FIG. 1, e.g., a data processing module) via the data connection (e.g., the data path 172 for the memory block 122, the data path 174 for the memory block 124, the data path 176 for the memory block 126).

FIG. 2 is a schematic illustration of structure of a memory block 200, according to an embodiment. The memory block 200 can be structurally and functionally similar to the memory block 122, 124 or 126 shown and described with respect to FIG. 1. Particularly, the memory block 200 can be coupled to (via a shared address bus, a common control interface and/or other connections) and accessed by a scheduler module similar to the scheduler module 110 shown and described with respect to FIG. 1.

As shown in FIG. 2, the memory space within the memory block 200 has a structure represented by a two-dimensional row-column format. Specifically, the total memory space within the memory block 200 is equally (or substantially equally) divided into a number of rows (e.g., indexed by 1, 2, 3, etc. in FIG. 2), and the memory space of each row is further equally (or substantially equally) divided into a number of columns (e.g., indexed by A, B, C, etc. in FIG. 2). Thus, each pair of a row index and a column index (e.g., row 6 and column J as highlighted in FIG. 2) represents a memory unit with a size that is equal (or substantially equal) to the size of each remaining memory unit within the memory space. As a result, each of such memory units can be identified by a unique pair of a row address (e.g., row 6) and a column address (e.g., column J).

For example, a memory block can have 16,000 rows, and each row can have 1024 columns. Thus, a row address or a column address can be represented by a 16-bit address variable. Each memory unit associated with a pair of a row address and a column address can have one byte. Thus, to read one byte of data from a memory unit associated with a row address represented by a first address variable 1001010001110010 and a column address represented by a second address variable 0000000001110010 from the memory block, the scheduler module can send a first signal (e.g., via the shared address bus) to the memory block. The first signal can include the first address variable and an indicator to activate the corresponding row of the memory block. The scheduler module can then send a second signal (e.g., via the shared address bus) to the memory block to initiate reading data from the corresponding memory unit. The second signal can include the second address variable and an indicator to read data from the memory unit that is identified by the first and second address variables (functioning as the row address and the column address, respectively). Details of data operations on memory blocks are further described below.

Returning to FIG. 1, the memory controllers 132, 134, 136 can be configured to send, to the scheduler module 110, memory commands associated with reading data from and/or writing data into the set of memory blocks. In some embodiments, each memory controller from the set of memory controllers can be uniquely associated with one memory block 122, 124, 126 from the set of memory blocks. That is, each memory controller 132, 134, 136 from the set of memory controllers can be configured to define memory commands for one and only one memory block 122, 124, 126 from the set of memory blocks. For example, the memory controller 132 is uniquely associated with the memory block 122, the memory controller 134 is uniquely associated with the memory block 124, and the memory controller 136 is uniquely associated with the memory block 126.

The memory commands sent from a memory controller 132, 134, 136 from the set of memory controllers can include, for example, a row address strobe (RAS) command, a column address strobe (CAS) command, a precharge command, a refresh command, and/or the like. The memory commands can also include a write command and/or a read command. In some embodiments, a write command can be a CAS command including an indicator that indicates the CAS command is to write data into a memory unit. Similarly, a read command can be a CAS command including an indicator that indicates the CAS command is to read data from a memory unit. In some embodiments, the memory commands can include a write command directly following a read command. For example, a write command (e.g., a CAS command to write data) associated with a memory block can be issued and executed after a read command or a series of read commands (e.g., CAS commands to read data) associated with the memory block being issued and executed, and no other command is executed at that memory block (i.e., the memory block is idle) between the last read command and the write command. Similarly, the memory commands can include a read command directly following a write command. For example, a read command (e.g., a CAS command to read data) associated with a memory block can be issued and executed after a write command or a series of write commands (e.g., CAS commands to write data) associated with the memory block being issued and executed, and no other command is executed at that memory block (i.e., the memory block is idle) between the last write command and the read command.

Each of the memory commands is associated with executing a corresponding operation at the memory block 122, 124, 126 from the set of memory block that is uniquely associated with the memory controller 132, 134, 136. For example, the memory controller 132 can send (at a certain point during an operation to access data at the memory block 122), to the scheduler module 110, a RAS command and three CAS commands followed by a precharge command, each of which is associated with the memory block 122. For another example, the memory controller 134 can send (at a certain point during an operation to access data at the memory block 124), to the scheduler module 110, a refresh command, a RAS command, and then a CAS command.

In some embodiments, each memory controller 132, 134, 136 from the set of memory controllers can operate as a logic upstream of the scheduler module 110 to control the timing of issuing memory commands to the corresponding memory block 122, 124, 126 associated with that memory controller. Particularly, the memory controller 132, 134, 136 can be configured to check timing parameters associated with the memory commands such that requirements on the timing for different types of memory commands can be satisfied when the memory commands are sent from the memory controller 132, 134, 136 to the scheduler module 110. For example, the memory controller 110 can check the timing parameters and control sending of memory commands such that the interval time period between sending two RAS commands associated with the corresponding memory block from the scheduler module 110 is greater than a predefined RAS gap parameter.

After the scheduler module 110 receives the memory commands from the set of memory controllers, the scheduler module 110 can be configured to schedule sending the received memory commands to the set of memory blocks 122, 124, 126 via the shared address bus 150. At most, one memory command can be sent to the set of memory blocks via the address bus 150 in each clock cycle. The scheduler module 110 can be configured to determine which memory command to send to the set of memory blocks (or not sending any memory command, i.e., being idle) at each clock cycle.

In some embodiments, data operations (e.g., reading data, writing data) on the memory blocks from the set of memory blocks can be performed in a burst operation mode. In such a burst operation mode, data is successively read from or written to multiple addresses within a row of a memory block before any address in another row of the memory block can be accessed. Thus, data can be successively read from or written to the addresses within the same row without the use of additional memory commands (e.g., RAS commands) from the scheduler module. In other words, for data operations requiring access to multiple column entries in a given activated row of a memory block, after an initial RAS command and a first CAS command, only additional CAS commands but not additional RAS command(s) can be issued to perform read/write accesses at the memory block. For example, a single RAS command followed by a series of CAS commands can be used for the burst data operation on memory units from the same row of the memory block.

In operation, to access data and perform a data operation (e.g., reading data, writing data) at a row of a memory block, the scheduler module 110 can be configured to first send a RAS command to the memory block to activate that row of memory units. The RAS command can include, for example, a row address (e.g., a 16-bit address variable) and an indicator (e.g., a 1-bit RAS flag) that indicates the command is a RAS command. In response to receiving the RAS command, for example, data from the activated row of memory units can be copied to a row buffer of the memory block. The scheduler module 110 can then be configured to send a series of CAS commands to the memory block to perform the data operation on the corresponding data. Similar to the RAS command, each CAS command can include, for example, a column address (e.g., a 16-bit address variable) and an indicator (e.g., a 1-bit CAS flag) that indicates the command is a CAS command. As discussed above, each CAS command can also include an indicator that indicates the CAS command is a read command or a write command. In response to receiving such a CAS command, for example, data can be read from or written into the corresponding memory unit of the row buffer that is identified by the column address within the CAS command.

After the data operation is finished, the scheduler module 110 can be configured to send a precharge command to the memory block to deactivate the row. When such a method to deactivate a row is performed, the memory system 100 can be referred to as being in an open page mode. Alternatively, a row can be deactivated by including an indicator in the last CAS command of the series of CAS commands. For example, an auto precharge (AP) bit within the last CAS command can be set to 1 to indicate this is the last CAS command of this burst operation and the row will then be deactivated. When such a method to deactivate a row is performed, the memory system 100 can be referred to as being in a close page mode. In response to receiving a deactivating signal (e.g., a precharge command or a CAS command with the AP bit being set to 1), the row buffer of the memory block can be precharged and data can be stored from the row buffer back to the corresponding row of the memory block. In other embodiments, data operation (e.g., reading data, writing data) can be performed in other methods at a memory block. For example, data can be read from and/or written into memory units of a memory block without using a row buffer.

As discussed above, at most one memory command can be sent within each clock cycle to the set of memory blocks via the shared address bus 150. For example, a RAS command for the memory block 122 can be sent via the address bus 150 in a first clock cycle, and a CAS command associated with the same row for the memory block 122 can be sent via the address bus 150 in a second clock cycle that immediately follows the first clock cycle. In some embodiments, memory commands for a memory block follow certain timing conditions. For example, the interval time period between two successive CAS commands on the same row can be no less than a certain threshold (e.g., 4 clock cycles for DDR3 SDRAM-based memory systems). As a result, after the scheduler module 110 sends a CAS command to a memory block, the scheduler module 110 does not send another CAS command to that memory block for a certain period of time (e.g., the next 3 clock cycles). Instead, to improve utilization efficiency of the shared address bus 150, the scheduler module 110 can be configured to send memory commands to other memory blocks during the certain period of time (e.g., the next 3 clock cycles).

In some embodiments, the scheduler module 110 can be configured to determine the order to send memory commands associated with multiple memory blocks based on a priority of each memory command. For example, each memory command can be classified into one of the four priority categories as follows (in the order from the highest priority to the lowest priority).

Category 1: RAS commands or precharge commands for throttle case scenarios. The throttle case scenario for a RAS command associated with a memory block occurs when one or more subsequent CAS commands for that memory block are blocked at the scheduler module 110 after the RAS command. That is, none of the CAS commands can be sent prior to sending of the RAS command. Similarly, the throttle case scenario for a precharge command associated with a memory block occurs when one or more subsequent RAS commands for that memory block are blocked at the scheduler module 110 after the precharge command. That is, none of the RAS commands can be sent prior to sending of the precharge command. In such throttle case scenarios, the RAS command (in the first throttle case scenario) or the precharge command (in the second throttle case scenario) is given the highest priority, thus sent to the set of memory blocks prior to other memory commands. As a result, no memory block is throttled because of the RAS command or the precharge command is stalled at the scheduler module 110 and blocks its subsequent commands.

Category 2: the first CAS command from a series of CAS commands associated with a burst data operation (e.g., reading data, writing data) on the same row (i.e., following a RAS command). Category 3: other CAS commands (i.e., a CAS command from a series of CAS commands associated with a burst data operation on the same row that is not the first CAS command).

A CAS command of category 2 has a higher priority than a CAS command of category 3. Thus, when a first CAS command associated with a first memory block (e.g., the memory block 122) and non-first CAS commands associated with a second memory block and a third memory block (e.g., the memory blocks 124, 126) are received at the scheduler module 110, the scheduler module 110 will send the first CAS command for the first memory block prior to sending the non-first CAS commands for the second and third memory blocks. As a result, data operation can be started at the first memory block, and data operation at the second and third memory blocks will be delayed for a single time cycle.

In some embodiments, each CAS command can have an additional marking (or indicator) to indicate if that particular CAS command is a first CAS command to be issued after a RAS command for the given row or not. For example, each CAS command can include a 1-bit flag to indicate whether that CAS command is a first CAS command or not. Thus, the scheduler module 110 can determine the order of CAS commands to be sent to the shared address bus 150 based on the additional marking of the CAS commands.

Category 4: RAS commands or precharge commands for normal operation scenarios. The normal operation scenarios for a RAS command or a precharge command associated with a memory block occur when that RAS command or precharge command does not throttle data operation (e.g., reading data, writing data) at that memory block (in other words, data operation at the memory block will not be halted, terminated or blocked by not executing that RAS command or precharge command). For example, when sufficient CAS commands are queued to be executed ahead of the RAS command or precharge command, data operation can be continued at the memory block without executing the RAS command or precharge command. For another example, when no subsequent CAS command exits to be executed after the RAS command, or no subsequent RAS command exists to be executed after the precharge command, then data operation will not be initiated at the memory block even after the RAS command or precharge command is executed. Therefore, the above-mentioned examples illustrate normal operation scenarios for that particular RAS command or precharge command.

On one hand, RAS commands and precharge commands for normal operation scenarios are the lowest-priority commands that are only used for activating or deactivating a row in a memory block when no further data operation is throttled. On the other hand, CAS commands are used to initiate data transfer, thus having a higher priority than the RAS commands and precharge commands for normal operation scenarios. As such, a ratio of a number of CAS commands sent from the scheduler module 110 to the set of memory blocks via the shared address bus 150 to a total number of clock cycles can be improved or substantially optimized.

In operation, to schedule memory commands at the schedule module 110 based on the priorities of the memory commands, the schedule module 110 can be configured to classify each memory command into one of the four categories of priority discussed above. In some embodiments, the classification can be based at least in part on the memory commands previously sent from the scheduler module 110 to the shared address bus 150. For example, a CAS command for a memory block can be classified into category 2 if the memory command for the memory block that immediately precedes the CAS command is a RAS command (thus making the CAS command a first CAS command for the row activated by the RAS command). For another example, a CAS command for a memory block can be classified into category 3 if the memory command for the memory block that immediately precedes the CAS command is another CAS command (thus making the CAS command of interest a non-first CAS command).

In some embodiments, the classification can be based at least in part on the memory commands that have been received at the scheduler module 110 and not yet sent from the scheduler module 110. For example, a RAS command for a memory block can be classified into category 1 if at least one subsequent CAS command for the memory block has been received at the scheduler module 110 and not yet sent (thus making the RAS command a RAS command in a throttle case scenario). For another example, a RAS command for a memory block can be classified into category 4 if no subsequent CAS command for the memory block has been received at the scheduler module 110 and not yet sent (thus making the RAS command a RAS command in a normal operation scenario).

After each memory command is classified into one of the four categories of priority, the scheduler module 110 can be configured to select an order in which to send each memory command to the set of memory blocks via the shared address bus. Such a selection can be based at least in part on the category of each memory command. In general, a memory command with a higher priority can be sent prior to a memory command with a lower priority.

In some embodiments, such a selection can be based at least in part on a predefined latency of a memory command. For example, if the interval time period between two successive CAS commands on the same row of a memory block is to be greater than a predefined threshold (e.g., 3 clock cycles for DDR3 SDRAM-based memory systems), then a subsequent CAS command for the memory block cannot be scheduled within the next three clock cycles that immediately follow the clock cycle in which a previous CAS command is scheduled. For another example, the scheduler module 110 can be configured to ensure a predefined number of clock cycles between a first RAS command for a memory block and a second RAS command for the memory block.

As an example of scheduling memory commands for four memory blocks based on the priorities of the memory commands as discussed above, the scheduler module 110 can send memory commands to a shared address bus of the four memory blocks in an order as follows (the table should be read left to right, top to bottom as indicative of time passing), where R1, R2, R3, R4 respectively indicate a RAS command for each of the four memory blocks; and C1, C2, C3, C4 respectively indicate a CAS command for each of the four memory blocks (assuming no precharge command is used):

| R1 | C1 | R2 | C2 | R3 | C3 | C1 | C2 |
|----|----|----|----|----|----|----|----|
| R4 | C3 | C4 | C1 | C2 | C3 | C4 | C1 |
| C2 | C3 | C4 | R1 | C2 | C3 | C4 | C1 |
| C2 | C3 | C4 | C1 | C2 | C3 | C4 | C1 |
| C2 | C3 | C4 | R1 | C1 | R2 | C2 | C4 |
| C1 | R3 | C2 | C3 | C1 | R4 | C2 | C3 |
| C4 | C1 | C2 | C3 | C4 | C1 | C2 | C3 |
| C4 | C1 | C2 | C3 | C4 | C1 | C2 | C3 |

As discussed above, the scheduler module 110 can receive, schedule, and send various types of memory commands such as, for example, RAS commands, CAS commands (including write commands and read commands), precharge commands, refresh commands, write commands directly following a read command, read commands directly following a write command, and/or the like. In some embodiments, each memory controller from the set of memory controllers can define refresh commands based on, for example, counters for the refresh interval for each corresponding memory block. Similarly, each memory controller from the set of memory controllers can define read commands and write commands based on, for example, the number of transactions (e.g., read transactions, write transactions) that have been made at each corresponding memory block. In some embodiments, a read command directly following a write command is also known as a write-read turnaround request, and a write command directly following a read command is also known as a read-write turnaround request.

In some embodiments, each refresh command, write command directly following a read command, or read command directly following a write command can be associated with a certain overhead. That is, in association with executing such a command at a memory block, that memory block is idle (i.e., not engage in any data operation) for a certain period of time (e.g., a number of clock cycles) before or after executing that command. For example, after executing a refresh command at a memory block, that memory block is scheduled to be idle for a predetermined period of time (i.e., idle time for the refresh command). For another example, after executing a write command at a memory block and before executing a read command directly following that write command at the memory block, the memory block is scheduled to be idle for a predetermined period of time (known as write-read turnaround, or write-to-read delay). Similarly, after executing a read command at a memory block and before executing a write command directly following that read command at the memory block, the memory block is scheduled to be idle for a predetermined period of time (known as read-write turnaround, or read-to-write delay). In some embodiments, for example, the write-to-read delay or read-to-write delay can be a constant for a given frequency of operation and/or a given DDR part type.

Accordingly, the scheduler module 110 can be configured to schedule memory commands for the set of memory blocks such that the idle time due to refresh, write-read turnaround and read-write turnaround for the memory blocks is staggered across all the memory blocks that share the address bus 150. As a result, at any given time only a single or a small number of memory blocks are idle due to refresh, read-write turnaround or write-read turnaround. Thus, the utilization efficiency of the shared address bus can be improved or substantially optimized.

In some embodiments, such a scheduling can be based on the idle time associated with a memory command (e.g., a refresh command, a write command directly following a read command or a read command directly following a write command) for each memory block from the set of memory blocks. For example, to execute a write command directly following a read command at a memory block, the memory block is scheduled to be idle for at least three clock cycles between execution of the read command and execution of the write command. As a result, after the read command for the memory block is issued from the scheduler module 110, the write command directly following the read command for that memory block will not be issued from the scheduler module 110 within next three clock cycles.

In some embodiments, similar to the RAS commands, CAS commands and precharge commands discussed above, each refresh command, read command following a write command and write command following a read command can be assigned a priority, and the defining and/or scheduling of those commands can be performed based on the priority of the commands. For example, a refresh command, read command following a write command or write command following a read command can be identified as a mandatory request or a normal request, where the mandatory request has a higher priority than a normal request. Specifically, a mandatory request (e.g., a mandatory refresh command, mandatory read command following a write command or mandatory write command following a read command) for a memory block indicates that the corresponding memory controller or the scheduler module 110 has reached or is going to immediately reach a predefined or programmed maximum time interval for the refresh operation, or a predefined or programmed maximum request count for the write-read turnaround or read-write turnaround to happen. Thus, the memory block can be serviced immediately by performing a corresponding operation (e.g., a refresh operation, a read-to-write operation, a write-to-read operation) on that memory block. On the other hand, a refresh command, read command following a write command or write command following a read command that is not classified as a mandatory request is classified as a normal request, and thus having a lower priority to be sent.

In some embodiments, memory commands (e.g., refresh commands, read commands following a write command, write commands following a read command) for a memory block can be defined at the corresponding memory controller and/or scheduled at the scheduler module 110 based on a predefined acceptable range for intervals between those memory commands. For example, DDR3 SDRAM specifications specify refresh commands are to be executed at each memory block at an average interval of 7.8 µs or 3.9 µs based on the temperature of the memory block. In such embodiments, the scheduler module 110 can be configured to schedule such memory commands based on a periodic (or substantially periodic) schedule that is compliant with the predefined acceptable range for intervals between those memory commands.

In some embodiments, for memory commands (e.g., refresh commands, read commands following a write command commands, write commands following a read command) that are scheduled periodically (or substantially periodically) for a given memory block, if the initial memory command is staggered at the corresponding memory controller or the scheduler module 110, subsequent memory commands can also be staggered at the corresponding memory controller or the scheduler module 110 according to the periodic schedule. In such embodiments, the scheduler module 110 can use a set of counters to keep track of the amount of time a memory command (e.g., a refresh command, read command following a write command or write command following a read command) has been performed. The set of counters can be used at the scheduler module 110 to, for example, block other memory blocks from performing a turnaround or refresh operation in the same timeframe of any given memory block performing the memory command unless the intended operation at the other memory blocks is a mandatory request.

FIG. 3 is a flow chart illustrating a method 300 for scheduling memory commands at a scheduler module, according to an embodiment. The method 300 can be executed at a scheduler module that is structurally and functionally similar to the scheduler module 110 shown and described with respect to FIG. 1. Particularly, the scheduler module can be operatively coupled to each memory block from a set of memory blocks (e.g., the memory blocks 122, 124, 126 in FIG. 1) via a shared address bus (e.g., the shared address bus 150 in FIG. 1). The scheduler module can also be operatively coupled to each memory controller from a set of memory controllers (e.g., the memory controllers 132, 134, 136 in FIG. 1). Furthermore, each memory controller from the set of memory controllers is uniquely associated with a memory block from the set of memory blocks. In some embodiments, the scheduler module and the set of memory controllers can be included in, for example, the same ASIC.

In some embodiments, the scheduler module 110 can be associated with a processor and/or a memory. The memory can be, for example, a non-transitory processor-readable medium. The code representing instructions to perform the method 300 can be stored in the non-transitory processor-readable medium associated with the scheduler module, and executed by the processor associated with the scheduler module. The code includes code to be executed by the processor to cause the scheduler module to operate the functions illustrated in FIG. 3 and described as follows.

At 310, the scheduler module can receive a set of memory commands from the set of memory controllers. Each memory command received from a memory controller is to be sent to and executed at the corresponding memory block that is uniquely associated with the memory controller from which that memory command was received. The set of memory commands can include, for example, a RAS command, a CAS command, a precharge command, a refresh command, a read command directly following a write command, a write command directly following a read command, and/or the like.

In the example of FIG. 1, the scheduler module 110 can receive a RAS command R1, and two CAS commands C1, C2 from the memory controller 132. The commands R1, C1 and C2 are to be sent to and executed at the memory block 122 that is uniquely associated with the memory controller 132. Similarly, the scheduler module 110 can also receive a RAS command R2 and a CAS command C3 from the memory controller 134. The commands R2 and C3 are to be sent to and executed at the memory block 124 that is uniquely associated with the memory controller 134.

At 330, the scheduler module can select a first memory command from the set of memory commands to send to the set of memory blocks via the shared address bus at a first clock cycle. In some embodiments, the scheduler module can select the first memory command based on, for example, a type of the first memory command and information of other memory commands from the set of memory commands. In some embodiments, for example, the type of the first memory command can be determined as one of the four priority categories discussed above. In some embodiments, the first memory command can be scheduled to be sent at the first clock cycle based on a comparison between the type (e.g., priority) of the first memory command and the type (e.g., priority) of the other memory commands from the set of memory commands.

At 350, the scheduler module can send the first memory command to the set of memory blocks at the first clock cycle via the shared address bus. As a result, the first memory command can be executed at a memory block associated with the first memory command and from the set of memory blocks. The memory block associated with the first memory command is the corresponding memory block, which is uniquely associated with the memory controller that defines the first memory command.

At 370, the scheduler module can select a second memory command from the set of memory commands to send to the set of memory blocks via the shared address bus at a second clock cycle. The second memory command can be associated with a memory block from the set of memory blocks that is the same as or different from the memory block associated with the first memory command. In some embodiments, the scheduler module can select the second memory command based on, for example, the type of the first memory command, a number of clock cycles between the first clock cycle and the second clock cycle, the memory block associated with the second memory command and from the set of memory blocks, a type of the second memory command, and/or the like. In some embodiments, for example, the type of the second memory command can be determined as one of the four priority categories discussed above. In some embodiments, the second memory command can be scheduled to be sent at the second clock cycle based on a comparison between the type (e.g., priority) of the second memory command and the type (e.g., priority) of the other memory commands from the set of memory commands.

At 390, the scheduler module can send the second memory command to the set of memory blocks at the second clock cycle. As a result, the second memory command can be executed at the memory block associated with the second memory command. The memory block associated with the second memory command is the corresponding memory block, which is uniquely associated with the memory controller that defines the second memory command.

In the example of FIG. 1, the scheduler module can schedule the memory commands based on the type (e.g., priority) of the memory commands and other information associated with the memory commands (e.g., timing conditions). Assuming a specified minimum interval between two successive CAS commands for a single memory block is 3 clock cycles, then the scheduler module can schedule an order for the memory commands R1, C1, C2, R2 and C3 as follows: R1, C1, R2, C3, C2. Specifically, R1 and C1 are selected for the first two clock cycles such that data operation on the memory clock 122 can be initiated at the earliest time that is possible. R2 and C3 are selected for the next two clock cycles such that data operation on the memory clock 124 can be initiated at the earliest time that is possible after R1 and C1 are sent. Consequently, C2 is scheduled at the last clock cycle.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory; and
a processor coupled to the memory, the processor configured to be operatively coupled to each memory block from a plurality of memory blocks via a shared address bus,
the processor configured to receive a plurality of memory commands from a plurality of memory controllers,
the processor configured to classify each memory command from the plurality of memory commands into a category from a plurality of categories based at least in part on a throttle status of a memory block associated with that memory command and from the plurality of memory blocks, the throttle status of the memory block associated with that memory command is based on that memory command causing a set of subsequent memory commands from the plurality of memory commands to be stalled,
the processor configured to select an order in which to send each memory command from the plurality of memory commands to the plurality of memory blocks via the shared address bus based at least in part on the category of each memory command from the plurality of memory commands.

2. The apparatus of claim 1, wherein the plurality of memory commands includes at least one of a Row Address Strobe (RAS) command, a Column Address Strobe (CAS) command, a precharge command, a refresh command, a write command directly following a read command, or a read command directly following a write command.

3. The apparatus of claim 1, wherein each memory block from the plurality of memory blocks is a Double Data Rate (DDR) Random Access Memory (RAM) block.

4. The apparatus of claim 1, wherein the plurality of memory blocks includes at least three memory blocks.

5. The apparatus of claim 1, wherein:
when a memory command from the plurality of memory commands is a RAS command and the set of subsequent memory commands from the plurality of memory commands are CAS commands,
the processor is configured to classify the memory command into a first category from the plurality of categories such that the memory command is sent to the memory block associated with the memory command from the plurality of memory blocks with a priority higher than a priority of the set of subsequent memory commands.

6. The apparatus of claim 1, wherein:
when a memory command from the plurality of memory commands is a precharge command and the set of subsequent memory commands from the plurality of memory commands are RAS commands,
the processor is configured to classify the memory command into a first category from the plurality of categories such that the memory command is sent to the memory block associated with the memory command from the plurality of memory blocks with a priority higher than a priority of the set of subsequent memory commands.

7. The apparatus of claim 1, wherein:
the processor is configured to classify each memory command from the plurality of memory commands into a category from the plurality of categories based at least in part on a subset of memory commands from the plurality of memory commands being associated with a burst data operation.

8. The apparatus of claim 1, wherein the processor is configured to ensure a predefined number of clock cycles between (1) a first Row Address Strobe (RAS) command from the plurality of memory commands and sent to a memory block from the plurality of memory blocks via the shared address bus and (2) a second RAS command from the plurality of memory commands and sent to the memory block via the shared address bus.

9. The apparatus of claim 1, wherein the processor is configured to substantially optimize a ratio of a number of Column Address Strobe (CAS) commands provided to the plurality of memory blocks via the shared address bus to a total number of clock cycles.

10. The apparatus of claim 1, wherein each category from the plurality of categories is associated with a different priority level from a plurality of priority levels.

11. The apparatus of claim 1, wherein:
the plurality of memory commands is a first plurality of memory commands; and
the processor is configured to classify each memory command from the first plurality of memory commands into a category from the plurality of categories based at least in part on a second plurality of memory commands previously sent from the processor to the plurality of memory blocks via the shared address bus.

12. A method, comprising:
sending a first memory command to a first memory block from a plurality of memory blocks;
receiving, at a first time, a second memory command from a first memory controller of a plurality of memory controllers;
receiving, at a second time after the first time, a third memory command from a second memory controller of the plurality of memory controllers;
classifying the second memory command into a first category from a plurality of categories based on a type of the first memory command, a type of the second memory command, and a type of the third memory command;
classifying the third memory command into a second category from the plurality of categories based on the type of the second memory command and the type of the third memory command; and
sending the second memory command to a second memory block from the plurality of memory blocks and the third memory command to a third memory block from the plurality of memory blocks in an order based on a priority of the first category and a priority of the second category.

13. The method of claim 12, wherein:
the second memory command is a Row Address Strobe (RAS) command;
the third memory command is a Column Address Strobe (CAS) command; and
the priority of the first category is higher than the priority of the second category.

14. The method of claim 12, wherein:
the second memory command is a precharge command;
the third memory command is a Row Address Strobe (RAS) command; and
the priority of the first category is higher than the priority of the second category.

15. The method of claim 12, wherein each memory block from the plurality of memory blocks is a Double Data Rate (DDR) Random Access Memory (RAM) block.

16. The method of claim 12, wherein the plurality of memory blocks includes at least three memory blocks.

17. The method of claim 12, wherein the first memory block is the second memory block.

18. The method of claim 12, wherein the sending the second memory command to the second memory block from the plurality of memory blocks and the third memory command to the third memory block from the plurality of memory blocks includes sending via a shared address bus.

19. The method of claim 12, wherein:
the sending the second memory command to the second memory block from the plurality of memory blocks includes sending the second memory command at a first clock cycle,
the sending the third memory command to the third memory block from the plurality of memory blocks includes sending the third memory command at a second clock cycle, a number of clock cycles between the first clock cycle and the second clock cycle meeting a predefined criteria.

20. A non-transitory processor-readable medium storing code representing instructions to be executed by a processor, the code comprising code to cause the processor to:
receive a first plurality of memory commands from a plurality of memory controllers;
classify each memory command from the first plurality of memory commands into a category from a plurality of categories based at least in part on (1) a second plurality of memory commands previously sent to a first plurality of memory blocks, or (2) a subset of memory commands from the first plurality of memory commands being received subsequently to that memory command, each category from the plurality of categories being associated with a priority level from a plurality of priority levels; and
send each memory command from the first plurality of memory commands to at least one memory block of a second plurality of memory blocks in an order based on a priority level from the plurality of priority levels associated with that memory command.

* * * * *